Dec. 9, 1952     E. D. MEADOWS ET AL     2,620,675
PULLEY
Filed June 3, 1947

INVENTORS.
ERNEST D. MEADOWS
RICHARD K. WHITEHEAD
BY
ATTORNEYS.

Patented Dec. 9, 1952

2,620,675

UNITED STATES PATENT OFFICE 2,620,675

PULLEY

Ernest D. Meadows and Richard K. Whitehead, Atlanta, Ga., assignors to Meadows Manufacturing Company, Atlanta, Ga., a corporation of Georgia Application June 3, 1947, Serial No. 752,150

4 Claims. (Cl. 74—230.8)

Our invention relates to pulleys and in particular to pulleys of sheet-metal construction.

It is an object of our invention to provide an improved pulley of the character indicated.

It is another object to provide an improved sheet-metal pulley construction having features of rigidity and great resistance to eccentric and angular misalignment.

It is a further object to provide an improved means for securing a pulley to a shaft.

It is a general object of the invention to provide a rugged sheet-metal pulley construction that may be fabricated at low cost.

Other objects and various further features of the invention will be pointed out or will occur to those skilled in the art from a reading of the following specification in conjunction with the accompanying drawings. In said drawings.

Figures 1, 2, 3:
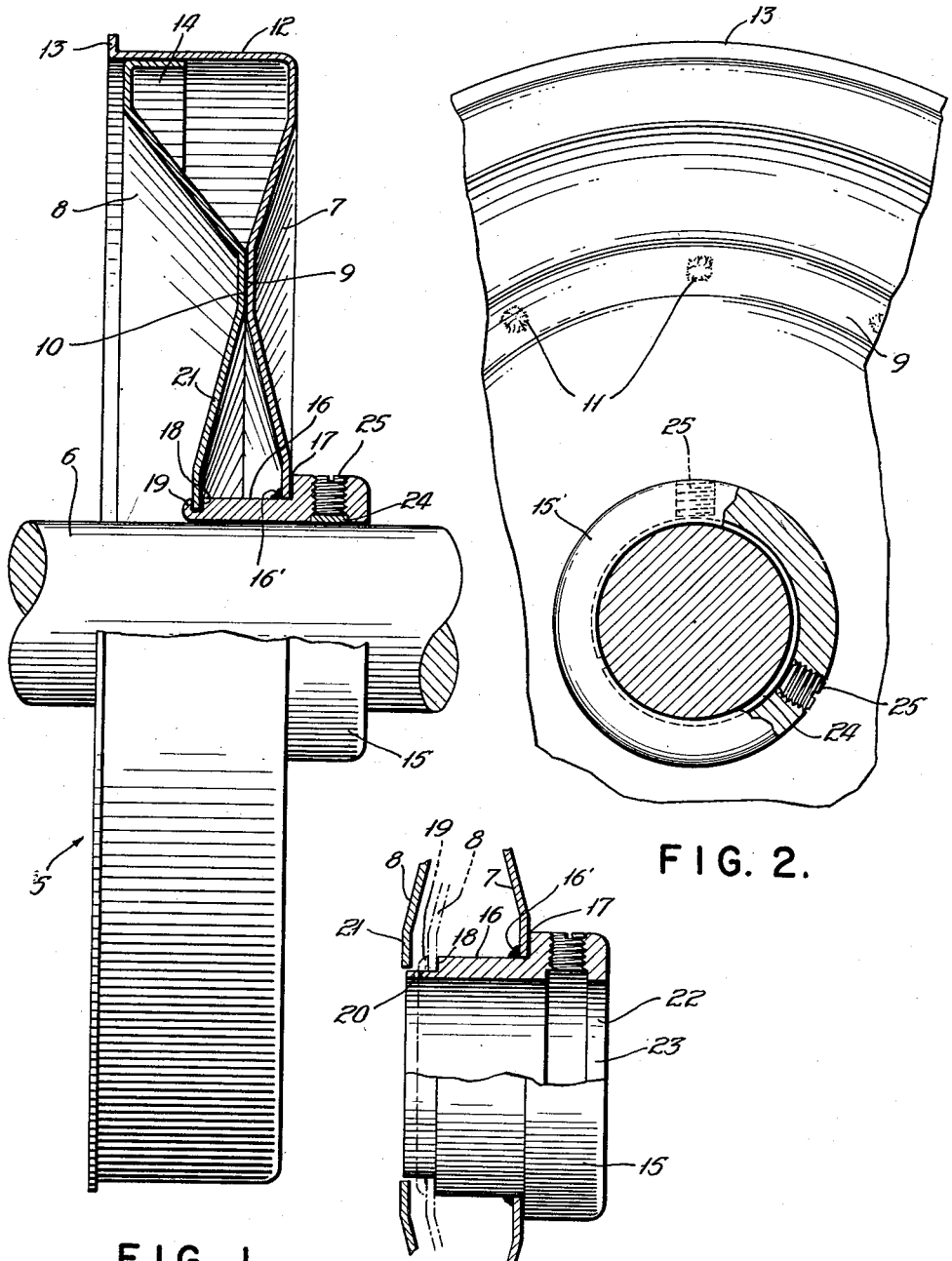
Fig. 1 is a partly sectionalized side view of a pulley incorporating features of our invention, shown mounted upon a shaft.
Fig. 2 is a fragmentary partly sectionalized end view of the arrangement of Fig. 1.
Fig. 3 is partly sectionalized side view of an element of the construction of Fig. 1.

Briefly stated, our invention contemplates an improved pulley construction wherein the pulley is essentially defined by two sheet-metal face-plate members in back-to-back abutment. One of the face-plate members is also formed with a peripheral drive-engaging portion and the other face-plate member engages the inner surface of said drive-engaging portion. Assembly is completed by a novel retaining hub which may axially anchor the two face-plate members. A novel securing means is incorporated into the hub construction whereby the completed assembly may be secured to a shaft or the like.

Referring to the drawings, my invention is shown in application to a pulley 5 mounted upon a shaft 6. In essence, the pulley 5 comprises two face-plate members 7—8 preferably of pressed steel and having annularly cupped portions mounted in back-to-back relation. The bottoms 9—10 of the annularly cupped portions are preferably in abutment and, if desired, the face plates 7—8 may be secured together at 9—10, as by spot welds 11. One of the face plates 7 preferably is formed with a drive-engaging portion or drum 12 which may be generally cylindrical to engage a tape or belt. If desired, the plate 7 may also support or be formed with a locating flange 13.

The other face plate member 8 preferably extends underneath the cylindrical portion 12 of plate 7 into abutment therewith, for supporting purposes. If desired, the plate 8 may be formed with a reentrant cylindrical portion or drum flange 14 providing extended support for the drive-engaging surface 12.

In order to support the described parts upon the shaft 6, the plates 7—8 may be secured to a central hub or boss 15, preferably of steel for the case of a driving pulley. In the form shown, a first plate member 7 may ride upon a first cylindrical surface 16 of hub 15 and axially abuts a radial flange or shoulder 17 on hub 15. The other plate member 8 may abut a second radial shoulder 18 and be held in such abutment by suitable retaining means. Referring to Fig. 3, it will be seen that the retaining means 19 may be a relatively thin cylindrical portion 20 on the hub 15, which cylindrical portion 20 may be swaged or otherwise upset to form the abutment 19.

In order to secure the drive-engaging surface or drum 12 against rotation with respect to the hub 15, the plate 7 which carries drum 12 may be locked on surface 16 or against shoulder 17. In the form shown, spot brazings or welds 16' may be applied after assembly of plate 7 to shoulder 17.

According to one preferred method of assembling the described pulley, the abutting relatively flat surfaces 9—10 of plates 7—8 may be spot-welded or otherwise secured, as at 11. According to another preferred method of assembly, no such securing means may be desired. With the latter method, it is preferred that prior to an upset of the relatively thin cylindrical portion 20, that is, prior to finally anchoring the plate 8, the inner wall 21 of the plate 8 be axially spaced from the shoulder 18, as shown in Fig. 3 (solid lines). Thus, to complete the second preferred method of assembly, a resilient compression of both plates 7—8 may be necessary to abut plate 8 against the shoulder 18. Such compression may be effected prior to or substantially coincidentally with the upsetting operation on the cylindrical portion 20. It will be clear that with such compression of the plates 7—8 into more firm abutting relation there may be slight radial expansion of the plates 7—8 and that such expansion may effect a good supporting bond between the cylindrical portions 14—12 at the periphery of the pulley. There thus may be no need for welding or otherwise securing these cylindrical portions 12—14 together.

In accordance with a feature of our invention, the bore 22 within the hub 15 may be formed with an annular recess 23 to accommodate shaft-securing means. In the form shown, an annular member or ring 24, preferably of relatively thin tempered steel, may be seated in said recess 23, and set screw means 25 carried by the hub 15 may engage the ring 24. It will be clear that such securing means may be effective to provide well-distributed extensive frictional contact between the hub 15 and the shaft 6 upon which it is mounted and that such contact may be extremely effective, without the peening or other destructive effects that ordinarily result from direct application of a set screw to a shaft. In the preferred form shown, a plurality of angularly spaced set screws 25 may engage the ring 24 to provide even more extensive binding contact for the pulley 5 upon the shaft 6.

It will be appreciated that we have described a relatively simple pulley construction adaptable to low-cost manufacture. The construction is such as inherently to provide highly effective bracing against possible eccentric and angular misalignment. The shaft-securing means not only provides protection to a shaft but also facilitates adjustment of the pulley on the shaft, as when sliding the pulley on and off the shaft.

While we have described our invention in detail for the preferred form shown, it will be understood that modifications may be made within the scope of the invention as defined in the appended claims.

We claim:

1. As an article of manufacture, a hub for a pulley of the character indicated, said hub including face-plate retaining means, said hub having a central shaft-receiving bore and an annular recess within said bore, an annular member seated in said recess, and set-screw means to engage said member.

2. In a pulley, a hub having a radially outwardly extending surface forming an axially facing shoulder, a face plate in abutment with said shoulder and welded thereto, said hub adjacent one end having a second axially facing shoulder substantially spaced from said first shoulder, a second face plate engaging said second shoulder, the end of said hub adjacent said second shoulder being beaded over the side of said second face plate to hold the same against said second shoulder.

3. As an article of manufacture, a pulley having a rim portion and a hub and web means connecting the rim portion and hub, said hub having a bore to receive a shaft, said hub having an annular groove opening into said bore intermediate the ends thereof, an annular member seated in said annular groove, said hub having a generally radial set screw means extending through said hub and into said annular groove to engage said annular member, for the purpose set forth.

4. In a pulley, a hub, said hub having an outer cylindrical portion and a radially outwardly extending surface at one end of said cylindrical surface and defining a radial shoulder at said one end, a face plate having a bore to fit said cylindrical portion and abutting said shoulder, said hub at the end opposite said shoulder being rabetted to form a second cylindrical portion of substantially smaller diameter than said first cylindrical portion, and a radial surface forming a second radial shoulder, a second face plate having a bore to fit said cylindrical portion of said smaller diameter and abutting said second radial shoulder, said hub at the end having a radially outwardly extending flange engaging said second face plate and holding the same firmly against said second shoulder.

ERNEST D. MEADOWS.
RICHARD K. WHITEHEAD.

REFERENCES CITED

The following references are of record in the file of this patent:

UNITED STATES PATENTS

| Number | Name | Date |
|---|---|---|
| 122,456 | Grimshaw | Jan. 2, 1872 |
| 614,166 | Fox | Nov. 15, 1898 |
| 859,099 | Nice | July 2, 1907 |
| 1,161,291 | Danielson | Nov. 23, 1915 |
| 1,211,541 | Carle | Jan. 9, 1917 |
| 1,480,359 | Wood | Jan. 8, 1924 |
| 1,708,969 | Gill et al. | Apr. 16, 1929 |
| 2,095,025 | Browning | Oct. 5, 1937 |
| 2,355,941 | Ash | Aug. 15, 1944 |
| 2,417,467 | Bryant | Mar. 18, 1947 |